United States Patent Office 3,493,534
Patented Feb. 3, 1970

3,493,534
POLYCARBONATES OF DIOLS DERIVED FROM DIMERIC FAT ACIDS
Arthur J. Coury, Minneapolis, and John E. Wicklatz, Wayzata, Minn., assignors to General Mills, Inc., a corporation of Delaware
No Drawing. Filed Dec. 11, 1967, Ser. No. 689,288
Int. Cl. C08f 7/10
U.S. Cl. 260—47                                         10 Claims

ABSTRACT OF THE DISCLOSURE

Copolycarbonates are prepared from dihydroxy-diaryl compounds and diols derived from dimeric fat acids.

---

The present invention relates to new polymer compositions, and more specifically to certain novel copolycarbonates of dihydroxy-diaryl compounds and diols derived from dimeric fat acids of 32 to 44 carbon atoms.

It is well known that various dihydroxy-diaryl compounds may be used in the preparation of polycarbonate polymers of high molecular weight which are industrially useful. Particularly, dihydroxy-diarylalkanes are so used. Such polymers however, have a tendency to exhibit the phenomenon of stress cracking. The term "stress cracking" describes the many small surface fractures of the molded polymer which appear, particularly in the presence of various semi-solvents, in the direction perpendicular to the axis of stress applied to such an article. Stress cracking may thus tend to weaken the article and tend also to cloud what may formerly have been a clear and transparent composition.

We have now discovered that highly useful new polycarbonate polymers may be prepared from dihydroxy-diaryl compounds and diols derived from dimeric fat acids. Polymers of this invention containing up to about 20 equivalent percent of the diols derived from dimeric fat acids are readily molded; and the resulting molded articles show significant reduction in stress cracking as compared to similar polycarbonate polymers prepared from dihydroxy-diaryl compounds alone. Such improvement is obtained without materially lowering the tensile modulus of elasticity. The polymers of the invention prepared from about 20 to 50 equivalent percent of diols derived from dimeric fat acid and correspondingly about 80 to 50 equivalent percent of the dihydroxy-diaryl compounds show a reduction in tensile modulus of elasticity and a considerable increase in flexibility, as evidenced by the increase in elongation of molded articles prepared therefrom. These latter polymers also find use as flexible coatings, sealants and the like.

In addition, various polymers of this invention show better tensile shear characteristics than do polycarbonates made from the corresponding dihydroxy-diaryl compounds alone. Thus the new polymers may also find use as adhesives.

It is an object of this invention to provide such new polymer compositions. This and other objectives will become apparent from the following description.

The diols used in combination with dihydroxy-diaryl compounds for the preparation of the polymers of the present invention contain 32 to 44 carbon atoms and are derived from the corresponding dimerized fat acids. Such diols can be represented by the general formula:

HO—CH₂—D—CH₂—OH where D is the divalent hydrocarbon radical of the dimerized fat acids exclusive of the carboxyl groups. D accordingly contains 30 to 42 carbon atoms.

The dimerized fat acids are prepared by polymerizing ethylenically unsaturated monobasic carboxylic acids having 16 to 22 carbon atoms or the lower alkyl esters thereof. The preferred acids are the mono and polyolefinically unsaturated 18 carbon atom acids. Representative octadecenoic acids are 4-octadecenoic, 5-octadecenoic, 6-octadecenoic (petroselinic), 7-octadecenoic, 8-octadecenoic, cis-9-octadecenoic (oleic), trans-9-octadecenoic (elaidic), 11-octadecenoic (vaccenic), 12-octadecenoic and the like. Representative octadecadienoic acids are 9,12-octadecadienoic (linoleic), 9,11-octadecadienoic, 10,12-octadecadienoic, 12,15-octadecadienoic and the like. Representative octadecatrienoic acids are 9,12,15-octadecatrienoic (linolenic), 6,9,12 - octadecatrienoic, 9,11,13 - octadecatrienoic (eleostearic), 10,12,14-octadecatrienoic (pseudoeleostearic) and the like. A representative 18 carbon atom acid having more than three double bonds is moroctic acid which is indicated to be 4,8,12,15-octadecatetraienoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18 - eicosapentanoic (timnodonic), 13-docosenoic (erucic), 11-docosenoic (cetoleic), and the like.

The ethylenically unsaturated acids can be polymerized using known catalytic or non-catalytic polymerization techniques. With the use of heat alone, the mono-olefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the dimerization of the unsaturated acids. Lower temperatures are generally used when a catalyst is employed.

The polymerization of the described ethylenically unsaturated acids yields relatively complex products which usually contain a predominant portion of dimerized acids, a smaller quantity of trimerized and higher polymeric acids and some residual monomers. The 32 to 44 carbon atom dimerized acids can be obtained in reasonably high purity from the polymerization products by vacuum distillation at low pressures, solvent extraction or other known separation procedures. The polymerization product varies somewhat depending on the starting fat acid or mixture thereof and the polymerization technique employed—i.e., thermal, catalytic, particular catalyst, conditions of pressure, temperature etc. Likewise, the nature of the dimerized acids separated from the polymerization product also depends somewhat on these factors although such acids are functionally similar.

Attempts have been made to delineate fully the structures of dimerized acids prepared from ethylenically unsaturated acids. These studies have been based largely on the products obtained by polymerizing linoleic acid or the methyl esters thereof or starting materials rich in linoleic acid or methyl linoleate. Paschke and Wheeler, in a study relating principally to the thermal polymerization of normal methyl linoleate, stated that at least two main products had been identified by others as resulting from such polymerization:

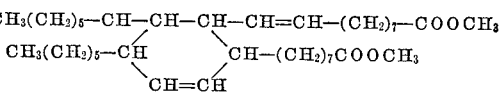

and

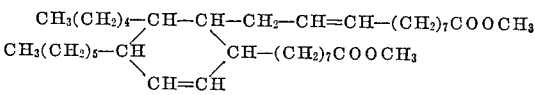

Their experimental work then indicated the latter structure predominated in the thermal polymerization product (The Journal of the American Oil Chemists Society, Vol. XXVI, No. 6, June 1949, pages 278-83). Moore theorized (using the Diels-Alder mechanism) that the polymerization of linoleic acid would yield a variety of 36 carbon atom acids of high structural similarity (Paint, Oil & Chemical Review, Jan. 4, 1951, pages 13-15, 26-29). Thus it was generalized that a portion of normal linoleic acid having the structure $$CH_3(CH_2)_4CH=CHCH_2CH=CH(CH_2)_7COOH$$

(depicted for convenience as R—C=C—C—C=C—R') would be conjugated during the polymerization to the 9,11 acid:

$$CH_3(CH_2)_4CH_2CH=CHCH=CH(CH_2)_7COOH$$

(depicted for convenience as R—C—C=C—C=C—R') It was then set forth that these acids could polymerize as follows:

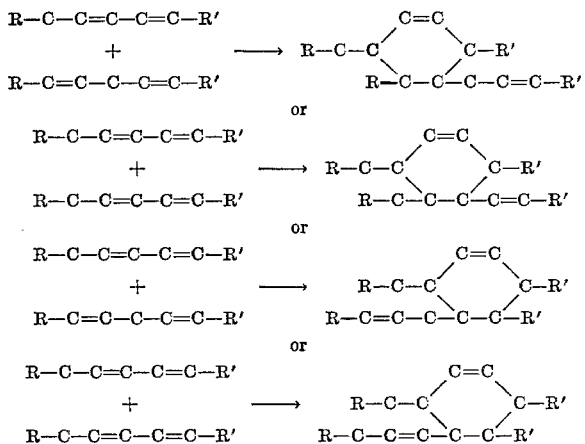

Moore further indicated that the 9,12-linoleic acid could also conjugate to the 10,12 acid and that this acid could self-polymerize or polymerize with the 9,12 or 9,11 acids. It was stated that the polymerizations could be "head-to-tail" as well as "head-to-head" as depicted above. Moore further stated that in many instances octadecatrienoic acids are present in many of the naturally occurring raw materials rich in octadecadienoic acids and that the self-polymerization of said acid could be depicted as follows:

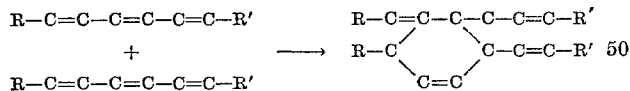

However, the author stated that such a product had not been isolated and that a second reaction probably takes place which could yield a diacid of the structure

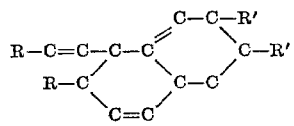

Ault et al. gave a possible structure for the dimer of methyl α-eleostearate, an ester of an octadecatrienoic acid, as follows:

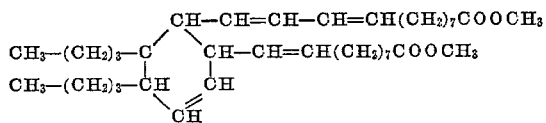

However, they also postulated that the structure could in fact be more complicated. Thus it was postulated that further cyclic rings were formed due to the high unsaturation giving a compound having the following proposed structure:

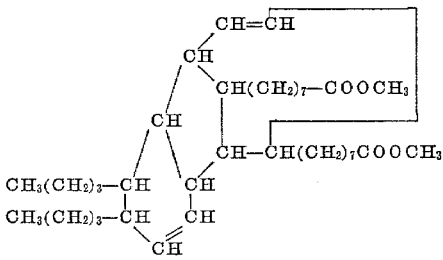

(Industrial And Engineering Chemistry, Vol. 34, No. 9, Sept. 1942, pages 1120-3).

Other information obtained is in essential agreement with the above studies. Thus analysis of dimerized acids prepared from linoleic acid rich starting materials using heat alone or heat plus a catalyst, such as an acid or alkaline clay, shows that the product contains structually similar acids having monocyclic tetrasubstituted cyclohexene ring structures as well as acids with two and three rings, such additional rings generally being fused to the six carbon atom ring. Additionally, the clay catalyzed dimerized acids have been shown to contain some aromatic rings according to ultraviolet and infrared spectroscopy. These aromatic rings are believed to be formed by hydrogen transfer (by catalytic action of clay) from the substituted cyclohexene ring to form a substituted benzene ring. Such acids are believed to comprise less than about 20% by weight of the dimerized fat acid. Polymerization of pure oleic acid using a clay catalyst has been shown to yield a mixture of dimerized fat acids of which approximately 25-30% by weight have a tetrasubstituted cyclohexane ring with the remainder being noncyclic. However, when mixtures of oleic and linoleic acids (such as from tall oil) are polymerized, the resulting dimerized fat acid contains little if any dimer having a non-cyclic structure.

It is thus apparent that the polymerization of the ethylenically unsaturated acids yields complex products. The dimer fraction thereof, generally consisting of a mixture of acids, can be assigned the formula:

$$HOOC—D—COOH$$

where D is a divalent hydrocarbon group containing 30 to 42 carbon atoms. It is also apparent that said divalent hydrocarbon group is complex. However, from the noted studies and other information that we have obtained, it can be seen that a mixture of acids normally results from the polymerization and subsequent fractionation of these acids have structural and functional similarities. Thus such mixture of acids contains a significant proportion of acids having a six carbon atom ring (about 25% or more even when the starting fat acid is a mono-olefinically unsaturated acid such as oleic). The remaining carbon atoms in the divalent hydrocarbon group of such ring containing acids are then divided between divalent and monovalent radicals which may be saturated or ethylenically unsaturated. Such radicals may form one or more additional cyclic structures which are generally fused to the first six membered ring. Such dimeric acid may be considered as having a theoretical idealized, general formula as follows:

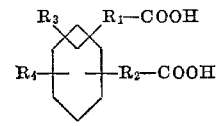

where $R_1$ and $R_2$ are divalent hydrocarbon radicals, $R_3$ and $R_4$ are monovalent hydrocarbon radicals and the sum of the carbon atoms in $R_1$–$R_4$ is 24–36. The ring contains one double bond. It is also understood that the $R_1$–$R_4$ radicals may form one or more additional cyclic structures which are generally fused to the first ring. It is further understood that the ring or rings may be saturated such as where the dimer acids are hydrogenated under conditions which convert the unsaturated acids to the corresponding saturated compounds.

As a practical matter, the dimeric fat acids are preferably prepared by the polymerization of mixtures of acids (or the simple aliphatic alcohol esters—i.e. the methyl esters) derived from the naturally occurring drying and semi-drying oils or similar materials. Suitable drying or semi-drying oils include soybean, linseed, tung, perilla, oiticia, cottonseed, corn, sunflower, dehydrated castor oil and the like. Also, the most readily available acid is linoleic or mixtures of the same with oleic, linolenic and the like. Thus, it is preferred to use as the starting materials, mixtures which are rich in linoleic acid. An especially preferred material is the mixture of acids obtained from tall oil which mixture is composed of approximately 40–45% linoleic and 50–55% oleic. It is also preferred to carry out the polymerization in the presence of a clay. Partial analysis of the dimer fraction obtained from the product prepared by polymerizing the tall oil fatty acids in the presence of 10% by weight of an alkaline montmorillonite clay at a temperature of 230° C. and a pressure of 140 p.s.i. for five hours showed that it was a mixture of $C_{36}$ acids, one significant component being

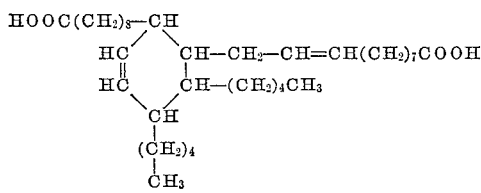

The methyl esters of such polymerized acids were used in the preparation of the diols in the examples to follow.

The dimeric fat acids or the lower alkyl esters (i.e., 1–8 carbon atoms) may be reduced by any of the conventional methods to the corresponding diols used in this invention. For examples of such conventional methods see U.S. Patents 2,347,000 and 2,413,612. In addition the diols may be prepared by the diisobutylaluminum hydride reduction of esters of the dimeric fat acids or by the lithium aluminum hydride reduction of such esters. One preferred laboratory method of preparing the diols is by the diisobutylaluminum hydride reduction of lower alkyl esters of the dimeric fat acids. The following example is illustrative of this method.

EXAMPLE A

A solution of 73.6 g. (0.518 mole) diisobutylaluminum hydride in 400 ml. heptane was added by means of a volumetric flask to a nitrogen-blanketed 2-l., 3-necked flask equipped with mechanical stirring, pressure-equalized dropping funnel containing a nitrogen inlet and a Y-tube holding a dip-in thermometer and condenser. Precautions were taken to exclude air from the system which would decompose the diisobutylaluminum hydride. The methyl ester of the dimeric fat acid (70.7 g., 0.238 eq.) in distilled hexane (250 ml.) was added over 20 minutes during which time the temperature rose to 68° C. Then the stirring rate was increased and the mixture was stirred for one hour. During this time the temperature dropped to 23° C. Then 300 ml. methanol was added slowly, because of the vigorous reaction. A thick gel formed, but the addition and stirring were continued, and the mixture became more fluid. Then 1000 g. of 10% by weight aqueous sulfuric acid was added with vigorous stirring, and the mixture formed two liquid layers. The organic layer was washed with water, and the solvent was removed on a rotary evaporator under reduced pressure (maximum temperature 90° C.). The yield of diol was 63.8 g. (95.6%).

A great variety of dihydroxy diaryl compounds may be combined with these diols derived from dimeric fat acids to yield the copolycarbonates of this invention. Dihydroxy-diarylalkanes of this class may be represented by the general formula:

$$HO\text{-}(Ar)\text{-}R^*\text{-}(Ar)\text{-}OH$$

where Ar is an aryl group and R* is a divalent aliphatic hydrocarbon group. Representative of R* are methylene, ethylene, propylene, butylene, pentylene, hexylene, heptylene, octylene, nonylene and substituted groups such as phenylmethylene and the like. Representative of the dihydroxy-diarylalkanes of this general formula are:

4,4'-dihydroxy-diphenylmethane,
4,4'-dihydroxy-diphenyl-1,1-ethane,
4,4'-dihydroxy-diphenyl-1,1-propane,
4,4'-dihydroxy-diphenyl-1,1-butane,
4,4'-dihydroxy-diphenyl-1,1-(2-methylpropane),
4,4'-dihydroxy-diphenyl-1,1-heptane,
4,4'-dihydroxy-diphenyl-1,1-(2-methylbutane),
4,4'-dihydroxy-diphenyl-1,1-(1-phenylmethane),
4,4'-dihydroxy-diphenyl-2,2-propane,
4,4'-dihydroxy-diphenyl-2,2-butane,
4,4'-dihydroxy-diphenyl-2,2-pentane,
4,4'-dihydroxy-diphenyl-2,2-(4-methylpentane),
4,4'-dihydroxy-diphenyl-2,2-heptane,
4,4'-dihydroxy-diphenyl-2,2-octane,
4,4'-dihydroxy-diphenyl-2,2-nonane,
4,4'-dihydroxy-diphenyl-3,3-pentane,
4,4'-dihydroxy-diphenyl-4,4-heptane,
4,4'-dihydroxy-diphenyl-1,1-cyclohexane,
4,4'-dihydroxy-3,3'-dicyclohexyl-diphenyl-2,2-propane,
4,4'-dihydroxy-3-methyl-diphenyl-2,2-propane,
4,4'-dihydroxy-3-isopropyl-diphenyl-2,2-butane,
4,4'-dihydroxy-3,3'-dibutyl-diphenyl-2,2-propane,
4,4'-dihydroxy-2,2'-dimethyl-diphenyl-2,2-propane,
4,4'-dihydroxy-3,3'-dimethyl-6,6'-dibutyl-diphenyl-1,1-butane,
4,4'-dihydroxy-3,3'-dimethyl-6,6'-di-tert.butyl-diphenyl-1,1-propane,
4,4'-dihydroxy-3,3'-dimethyl-6,6'-di-tert.butyl-diphenyl-1,1-(1-phenyl-methane),
4,4'-dihydroxy-3,3'-dimethyl-6,6'-di-tert.butyl-diphenyl-1,1-(2-methyl-pentane),
4,4'-dihydroxy-diphenyl-4-methyl-phenylmethane, and
4,4'-dihydroxy-diphenyl-4-isopropyl-phenylmethane.

Among the suitable dihydroxy-diarylalkanes suggested in the above non-exhaustive list, the preferred compositions are from a group comprised of structures where Ar is a benzene radical, R* is an alkylene radical of one to five carbon atoms, and the hydroxy groups are in para positions. Particularly preferred is 4,4'-dihydroxy-diphenyl-2,2-propane.

In addition to the dihydroxy-diarylalkanes suggested above, dihydroxy-diarylsulphones and dihydroxy-diarylethers may also be used. In such instances R* of the generalized formula above would be

and —O— respectively. Representative of compounds of these classes are:
4,4'-dihydroxy-diphenylsulphone,
3,3'-dihydroxy-diphenylsulfone,
4,4'-dihydroxy-2,2'-dimethyl-diphenylsulfone,
2,2'-dihydroxy-4,4'-dimethyl-diphenylsulfone,
4,4'-dihydroxy-3,3'-diethyl-diphenylsulfone,
4,4'-dihydroxy-3,3'-di-tert.butyl-diphenylsulfone,
4,4'-dihydroxy-diphenylether,
4,4'-dihydroxy-2,2'-dimethyl-diphenylether,
2,2'-dihydroxy-4,4'-dimethyl-diphenylether, and
4,4'-dihydroxy-3,3'-diethyl-diphenylether.

The copolycarbonate polymers of our invention are preferably prepared by condensing the diols derived from the dimeric fat acids and the dihydroxy diaryl compounds with phosgene. Such phosgenation can be carried out using conventional techniques. See Schnell, Chemistry and Physics of Polycarbonates, ch. III (1964), for a general discussion of the preparation of polycarbonates by phosgenation.

Phosgenation proceeds when phosgene is introduced to a solution of the reactants in organic bases such as trimethylamine, pyridine, and diethylaniline, or in inert (with respect to the compositions present in this class of reactions) organic solvents such as methylene chloride, ligroin, chloroform, benzene, hexane and carbon tetrachloride, with addition of an acid-binding agent such as a tertiary amine. Preferred phosgenation reactions employ the solution in pyridine, or in methylene chloride with the addition of a small amount of pyridine. It is also preferred to react the phosgene with a mixture of the two dihydroxy reactants, although good results have also been obtained by first reacting the dihydroxy diaryl compound with the phosgene and then adding the diol derived from the dimeric fat acid and continuing the reaction.

The new copolycarbonates may be represented by the following idealized, general structural formula:

$$H \left[ O-R_p-O-\overset{O}{\underset{\|}{C}} \right]_n O R_p-OH$$

where $R_p$ is $\text{-(Ar)-R*-(Ar)-}$ or $-CH_2-D-CH_2-$, such latter group being present in an amount sufficient to reduce the stress cracking tendencies of the polycarbonate polymers and up to about 50 equivalent percent. In this general structural formula, $n$ is best described as an integer such that the inherent viscosity of a 0.5% by weight solution of the copolycarbonate in o-chloro-phenol at 30° C. is at least about 0.2 (A.S.T.M. D1601–61, with the modification that a Cannon-Fenske viscometer was used instead of a Ubbelohde). Inherent viscosity is a property which reflects the size of the average molecule of the polymer. In the case of essentially linear polymers, such as those of this invention, the size of the average molecule is directly proportional to the average molecular weight of the polymer. Less preferably $n$ may be described as an integer of 2 or more by dividing the average molecular weight, empirically derived from data obtained for example from a membrane osmometer, by the weighted average of the molecular weights of the component units of the copolymer. For example if the molecular weight was empirically determined by measurements of a membrane osmometer to be 68,500 and the equivalent percent of the bisphenol A and the diol were assumed to be in a 80:20 ratio (weight percent), then $n$ would be determined as follows:

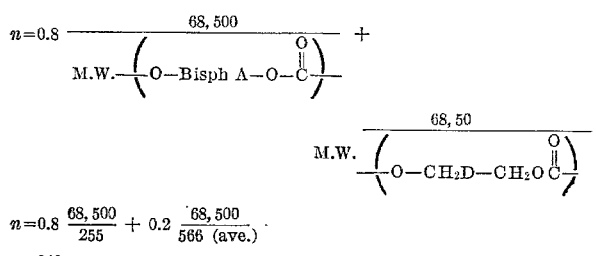

$n=240$

Various copolycarbonates of this invention were found to have a range for $n$ of 79 to 240. Preferably $n$ should be between about 25 and about 1000 or more. However, such calculated values for $n$, while properly descriptive, may not be as useful because they are derived from empirical relationships very dependent upon the exact composition and characteristics of a given sample of product and upon the particular method of testing. Thus, $n$ is such an integer that the inherent viscosity in o-chlorophenol (0.5% at 30° C.) is at least about 0.2. More preferably, such inherent viscosity will be between about 0.4 and 2.5 or more. It is further preferred that the $$\text{-(Ar)-R*-(Ar)-}$$

and $-CH_2-D-CH_2-$ groups are present in an equivalent ratio of about 95:5::50:50.

The following specific examples are intended to illustrate more fully the nature of the invention, but are not to be construed as a limitation upon the scope thereof.

Example I

Phosgene was bubbled into a stirring solution of 30 g. (0.113 eq.) of diol as prepared in Example A, 87 g. (1.1 eq.) pyridine, and 70 g. (0.614 eq.) bisphenol A in 500 ml. methylene chloride at a rate of about 0.8 g./min. for 40 min. and then at a rate of about 0.3 g./min. for 50 min., or until a total of 49 g. (1.0 eq.) was introduced. The temperature was maintained below 25° C. by cooling with a water bath. Pyridine hydrochloride began to precipitate after 35 minutes. The mixture became thicker after 75 minutes. At this point an additional 250 ml. of methylene chloride was added. The mixture assumed a pinkish-orange color at the end of the addition, signifying the end point. The mixture was shaken with 500 ml. 10% hydrochloric acid. The organic solution was washed with water and methanol-water solutions until no acid indication was shown on universal pH paper. The product was isolated by triturating the organic solution with hexane in a Waring Blendor, removing the solid by filtration, and drying to a constant weight at 140° C. in a vacuum oven. The yield was 100 g. (91.5%). The molecular weight of the product was determined to be about 42,300 (as measured on a Membrane Osmometer). The product had the general formula set forth hereinabove, with Ar being benzene, and R* being $$-\underset{\underset{CH_3}{|}}{\overset{\overset{CH_3}{|}}{C}}-$$

It consisted mainly of a mixture of such linear polymers, $n$ having an average value of 152. A portion of the polymer was compression molded at 240° C. to yield a sheet having a thickness of 42 mil. The molded polycarbonate copolymer had the following properties: tensile ultimate of 6,900 p.s.i. (A.S.T.M. D1708–59T), yield stress of 6,800 p.s.i. (A.S.T.M. D1708–59T), percent elongation of 107 to 145 (A.S.T.M. D1708–59T) and tensile modulus of elasticity of 206,000 using A.S.T.M. test procedure D638–61T on a specimen made from die C of A.S.T.M. D412–62T. The molded article also showed less stress cracking than a similar polymer prepared from bisphenol A alone. Stress cracking was compared by bending 1 in. by 3.5 in. by 40–50 mm. samples of the polymer around an elliptical jig with semi-axes of 1.5 in. and 5 in. and immersing the samples in a semisolvent system of 25% acetone and 75% isopropyl alcohol (by volume). Lengths of stress cracks along the samples were compared. See, R. L. Bergen, Jr., "Stress Cracking of Rigid Thermol Plastics," S.P.E. Journal, June 1962, pp. 667–670. In addition, the copolycarbonate of this example had a tensile modulus of elasticity which was slightly higher than the polycarbonate prepared from bisphenol A alone.

Example II

The steps described in Example I were essentially repeated except that the equivalent ratio of bisphenol A to the diol was 90:10. The polycarbonate copolymer (94% yield) had an inherent viscosity in o-chlorophenol (0.5% at 30° C.) of 1.40, a softening point range of 200–225° C., and a molecular weight of 68,500 (measured by a membrane osmometer). It had the same formula as the product in Example I, n being of an average value of about 240. The resulting molded article had the following properties (as measured in Example I): tensile ultimate of 7,700 p.s.i., yield stress of 8,000 p.s.i., percent elongation of 98 to 113 and tensile modulus of elasticity of 197,000. The molded polymer was found to have a tensile shear on chrome treated steel (A.S.T.M. D1002–64, of 2095 p.s.i., and Military Specification Mil–A–5090D) as compared to a tensile shear of 723 p.s.i. for a polycarbonate made from 100% bisphenol A. The new molded polymer also showed less stress cracking than a polymer prepared from bisphenol A alone. While the tensile modulus of elasticity was slightly lower than that of Example I, it was still quite high and the product had good flexibility, indicating its utility in various molding applications.

Example III

Phosgene was bubbled into a solution of 30.8 g. (0.27 eq.) 4,4′-dihydroxy-diphenyl-2,2-propane (bisphenol A) and 23.8 g. (0.09 eq.) diol as prepared in Example A, and 350 ml. pyridine at a rate of 0.5 to 1 g./min. for 30 minutes, and then at a rate of 0.25–0.5 g./min. for 20 minutes with stirring (total: 24 g., 0.48 eq.). The temperature was maintained at 25° C. during this time by cooling with a water bath. Pyridine hydrochloride began to precipitate after 15 minutes. The mixture became much thicker after 45 minutes, and a pink color signifying the end point was detectable at the end of the phosgene addition. The product was stirred for 10 minutes and allowed to sit for 20 minutes. It was then poured into 400 ml. methanol stirring in a Waring Blendor. The precipitated product which had congealed was taken up in methylene chloride, acidified with 10% hydrochloride, and washed with water to a neutral pH indication. The bulk of the solvent was removed on a steam bath. The product was further dried in a vacuum oven to a constant weight at 125° C. The yield was 55.0 g. (92.7%). The polymer had an inherent viscosity in o-chlorophenol (0.5% at 30° C.) of 0.68, and a softening point range of 125–150° C. The product was of the same general structural formula as the product in Example I, and the resulting molded sheet had the following properties (as measured in Example I): tensile ultimate 3,900 p.s.i., average percent elongation 169%, and tensile modulus of elasticity 12,200.

Example IV

The steps described in Example III were essentially repeated except that the equivalent ratio of bisphenol A to the diol mixture was 80:20. The polycarbonate copolymer (90% yield) had an inherent viscosity in o-chlorophenol (0.5% at 30° C.) of 0.59, and a softening point range of 175–200° C. The molded sheet had the following properties (as measured in Example I): tensile ultimate 5,900 p.s.i., yield stress 5,100 p.s.i., percent elongation 137–151%, and tensile modulus of elasticity 140,000. The product had the same general structural formula as that of Example I.

Example V

The steps described in Example I were essentially repeated except that the equivalent ratio of bisphenol A to the mixture of the diols of the fat acids was 78:22. The copolycarbonate product (90% yield) had an inherent viscosity in o-chlorophenol (0.5% at 30% C.) of 1.19, a molecular weight (measurement by a membrane osmometer) of 51,600 and n was 158. Adhesive properties of the product were tested as in Example II, and the tensile shear was found to be 2425 p.s.i. The softening point range was 150–175° C. The product was of the same general structure as that of Example I, and the resulting molded sheet had the following properties (as measured in Example I): tensile ultimate 5,900 p.s.i., yield stress 4,500 p.s.i., percent elongation 143–158%, and tensile modulus of elasticity 125,000.

Example VI

The steps described in Example I were essentially repeated except that the equivalent ratio of 4,4′-dihydroxy-diphenyl-2,2-propane to the diols produced in Example A was 66:34. The polymer thus produced had an inherent viscosity in o-chlorophenol (0.5% at 30° C.) of 0.85, the molecular weight as measured by a membrane osmometer was about 28,700 and n was about 79. The product softened at temperatures approaching up to 165° C. Adhesive properties of the product were tested as in Example II, and the tensile shear was found to be 875 p.s.i. The copolycarbonate was of the same general structural formula as that of Example I, and the resulting molded sheet exhibited the following properties (as measured in Example I): tensile ultimate 2,800 p.s.i., percent elongation 312–318%, and tensile modulus of elasticity less than 1000.

It is to be understood that the invention is not to be limited to the above examples which are illustrative only. Obvious modifications and equivalents to the described compositions and methods of operation will be apparent to those skilled in the art.

What is claimed is:

The embodiments of the invention in which an exclusive property or privilege is claimed are defined as follows:

1. A copolycarbonate polymer having the idealized structural formula $$\left[ -\!\!-\!\!O\!-\!R_p\!-\!O\!-\!\overset{O}{\underset{\|}{C}}\!-\! \right]_n \!\!-\!\!O\!-\!R_p\!-\!OH$$

where n is an integer representing the number of recurring structural units in the polymer chain, such integer being of a magnitude such that the inherent viscosity of 0.5% by weight solution of the copolycarbonate in o-chlorophenol at 30° C. is at least about 0.2, and where $R_p$ is $-(Ar)-R^*-(Ar)-$ or $-CH_2-D-CH_2-$ Ar being an aryl radical, R* being a divalent radical selected from a group consisting of a divalent aliphatic hydrocarbon radical, an oxygen atom, and a sulfur dioxide radical, and D being the divalent hydrocarbon radical of a dimeric fat acid and containing 30 to 42 carbon atoms, said radical $-CH_2-D-CH_2-$ being present in an amount sufficient to reduce the stress cracking tendencies of the polymer when molded and up to an amount equal to 50 percent of the total number of $R_p$ radicals.

2. The polymer of claim 1 wherein Ar is

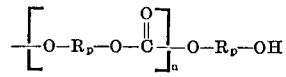

and R* is a divalent saturated hydrocarbon radical of one to five carbon atoms.

3. The polymer of claim 1 wherein R* is $$-\overset{O}{\underset{\overset{\|}{O}}{\overset{\|}{S}}}-$$

4. The polymer of claim 1 wherein R* is

—O—

5. The polymer of claim 2 wherein R* is $$-\overset{CH_3}{\underset{CH_3}{\overset{|}{C}}}-$$

6. The polymer of claim 1 wherein D contains 34 carbon atoms and is derived from dimerized fat acid obtained by polymerizing ethylenically unsaturated monocarboxylic acids of 18 carbon atoms.

7. The polymer of claim 6 wherein the ethylenically unsaturated monocarboxylic acids comprise a mixture rich in linoleic acid.

8. The polymer of claim 1 where n is an integer of such magnitude that the inherent viscosity of the polymer in o-chlorophenol (0.5% at 30° C.) is between about 0.4 and about 2.5.

9. The polymer of claim 1 wherein the ⁅Ar⁆R*⁅Ar⁆ and —CH₂—D—CH₂— groups are present in an equivalent ratio of about 95:5::50:50.

10. The polymer of claim 9 where Ar is

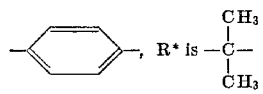

D is the divalent hydrocarbon radical of dimerized fat acids obtained by polymerizing a mixture of ethylenically unsaturated monocarboxylic acids of 18 carbon atoms rich in linoleic acid, and $n$ is an integer such that the inherent viscosity of the polymer in o-chlorophenol (0.5% at 30° C.) is between about 0.4 and about 2.5.

References Cited

UNITED STATES PATENTS

| | | |
|---|---|---|
| 3,136,741 | 6/1964 | Schnell et al. _____ 260—47 |
| 3,161,615 | 12/1964 | Goldberg _____ 260—47 |

SAMUEL H. BLECH, Primary Examiner

U.S. Cl. X.R.

117—161; 260—407, 49

UNITED STATES PATENT OFFICE
CERTIFICATE OF CORRECTION

Patent No. 3,493,534      Dated February 3, 1970

Inventor(s) Arthur J. Coury, John E. Wicklatz

It is certified that error appears in the above-identified patent and that said Letters Patent are hereby corrected as shown below:

Column 7, lines 60-64, that portion of the formula reading

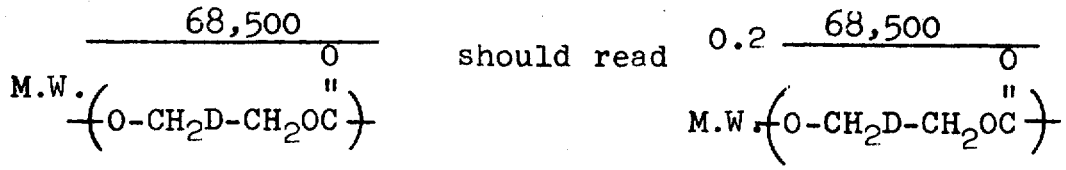

column 7, lines 65-67, that portion of the formula reading

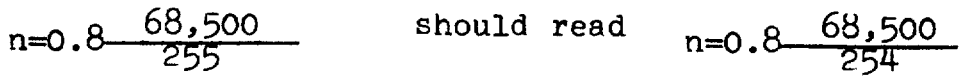

Column 10, lines 28-31, that portion of the formula reading

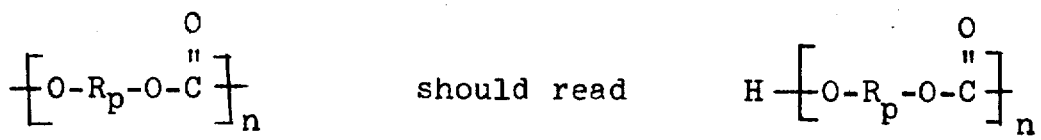

SIGNED AND SEALED
SEP 22 1970

(SEAL)
Attest:

Edward M. Fletcher, Jr.
Attesting Officer

WILLIAM E. SCHUYLER, JR.
Commissioner of Patents